(12) United States Patent
Dai et al.

(10) Patent No.: US 9,212,890 B2
(45) Date of Patent: Dec. 15, 2015

(54) MEASURING DEVICE

(71) Applicants: FU DING ELECTRONICAL TECHNOLOGY (JIASHAN) CO., LTD., Zhejiang (CN); HON HAI PRECISION INDUSTRY CO., LTD., New Taipei (CN)

(72) Inventors: Wei-Zhong Dai, Jiashan (CN); Qun-Fan Xu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 105 days.

(21) Appl. No.: 14/191,462

(22) Filed: Feb. 27, 2014

(65) Prior Publication Data
US 2014/0290083 A1    Oct. 2, 2014

(30) Foreign Application Priority Data

Mar. 26, 2013  (CN) .................. 2013 2 0141672 U

(51) Int. Cl.
*G01B 5/02* (2006.01)
*G01B 5/00* (2006.01)

(52) U.S. Cl.
CPC ............... *G01B 5/02* (2013.01); *G01B 5/0002* (2013.01)

(58) Field of Classification Search
CPC ........ G01B 5/008; G01B 21/04; G01B 11/03; G01B 11/24; G01B 21/047; G01B 11/245; G01B 21/08; G01B 11/27; G01B 11/002; G01B 5/004

USPC ............................................ 33/549, 552–555
See application file for complete search history.

(56) References Cited

U.S. PATENT DOCUMENTS

| | | | | |
|---|---|---|---|---|
| 5,886,494 A | * | 3/1999 | Prentice et al. ................ | 33/1 M |
| 6,163,971 A | * | 12/2000 | Humphries et al. ............ | 33/515 |
| 6,772,529 B1 | * | 8/2004 | McGrath ......................... | 33/556 |
| 8,621,761 B2 | * | 1/2014 | Boyer et al. .................... | 33/552 |
| 2009/0190110 A1 | * | 7/2009 | Shibazaki ....................... | 33/706 |
| 2011/0162221 A1 | * | 7/2011 | Knoke et al. ................... | 33/228 |
| 2013/0185948 A1 | * | 7/2013 | Racine ............................ | 33/503 |
| 2013/0227850 A1 | * | 9/2013 | Singh et al. .................... | 33/502 |
| 2014/0026430 A1 | * | 1/2014 | Xu et al. ......................... | 33/549 |
| 2014/0290083 A1 | * | 10/2014 | Dai et al. ........................ | 33/700 |

* cited by examiner

*Primary Examiner* — Yaritza Guadalupe-McCall
(74) *Attorney, Agent, or Firm* — Novak Druce Connolly Bove + Quigg LLP

(57) ABSTRACT

A measuring device includes a measuring platform, a length measuring mechanism, a width measuring mechanism, a segment difference measuring mechanism, and a controller. The measuring platform includes a fixing board and a support bracket mounted on the fixing board. The length measuring mechanism is mounted on the fixing board for measuring a length of a workpiece. The width measuring mechanism is mounted on the fixing board for measuring a width of the workpiece. The segment difference measuring mechanism for measuring a segment difference, includes a first measuring assembly and a second measuring assembly. Both the first measuring assembly and second measuring assembly include a sensor, a measuring member movably passing through the sensor, and a driver connected to the measuring member. The controller is electrically connected with the length measuring mechanism, the width measuring mechanism, the sensor of the first measuring assembly, and the sensor of the second measuring assembly.

18 Claims, 6 Drawing Sheets

MEASURING DEVICE

BACKGROUND

1. Technical Field

The present disclosure generally relates to measuring devices, and particularly to a measuring device for measuring workpieces.

2. Description of the Related Art

A typical measuring device for measuring workpieces, includes a measuring platform, a length measuring mechanism, a width measuring mechanism, a height measuring mechanism, and a controller electrically connected with the measuring mechanisms. The length measuring mechanism, the width measuring mechanism, and the height or depth measuring mechanism are movably positioned on the measuring platform for contacting with the workpiece to respectively obtain a length, a width, and a height or depth of the workpiece. However, a segment with different surface heights, such as stepped surfaces of a stepped recess defined in the workpiece, cannot be measured together with the length, the width, the height, and the depth at one time.

Therefore, there is room for improvement within the art.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
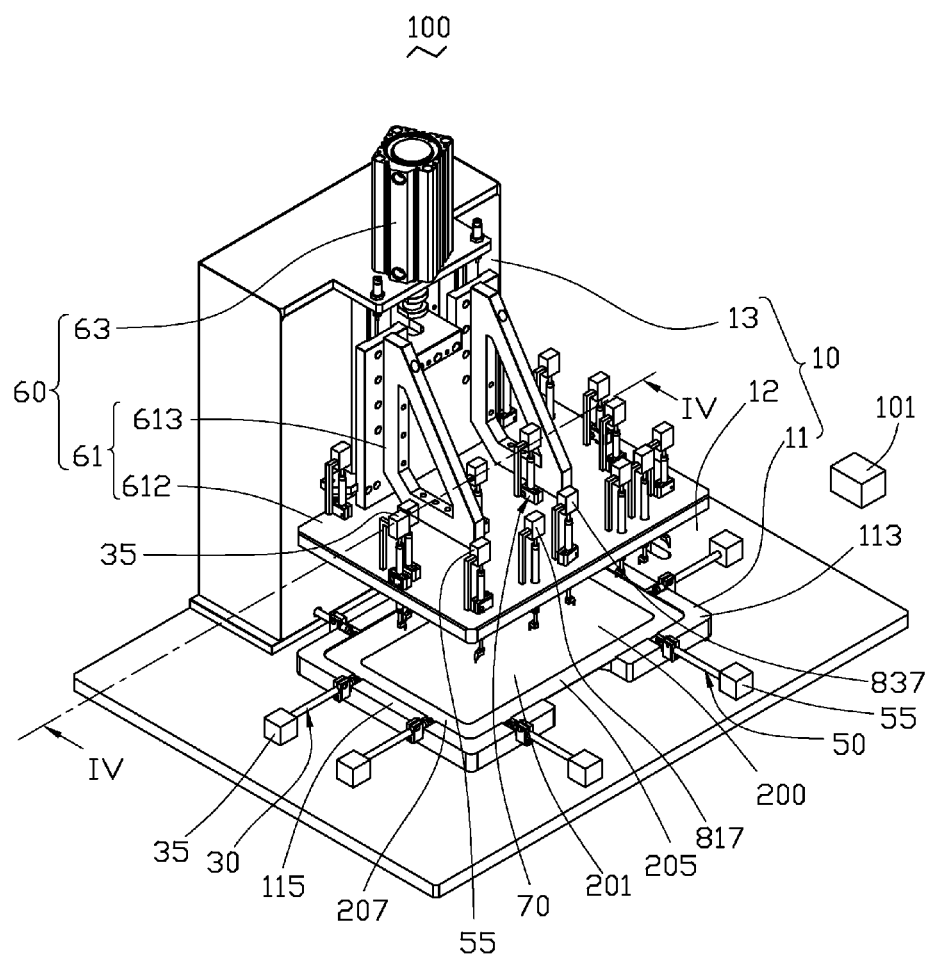
FIG. 1 shows an assembled, isometric view of an embodiment of a measuring device with drivers and a controller.
Figure 4:
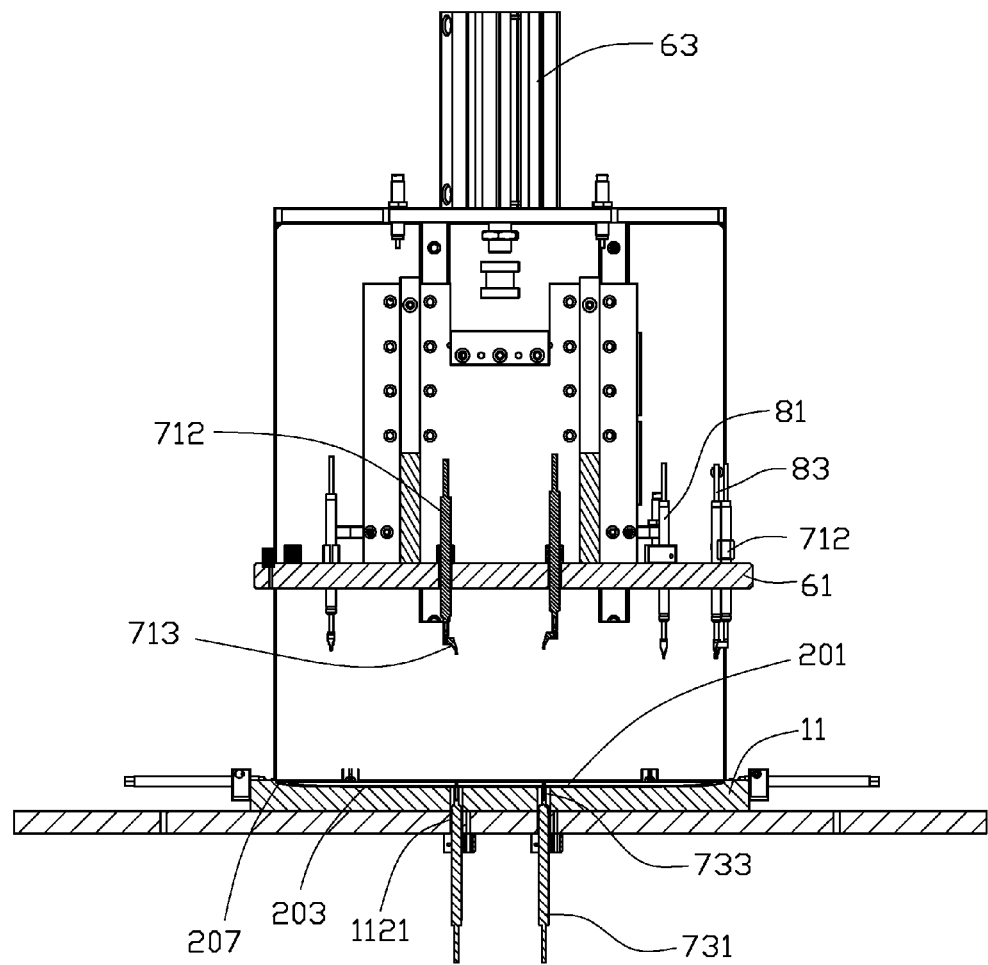
FIG. 4 is a cross-section view of the measuring device without the drivers and the controller of FIG. 1 along a line IV-IV.
Figure 5:
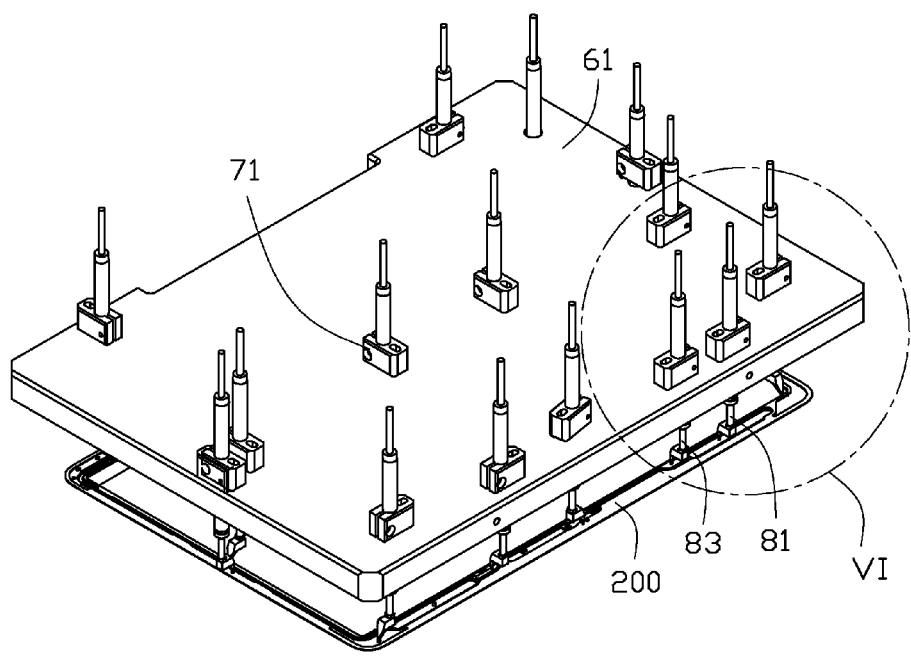
FIG. 5 shows a working state for the measuring device removed drivers and the controller of FIG. 1.
Figure 6:
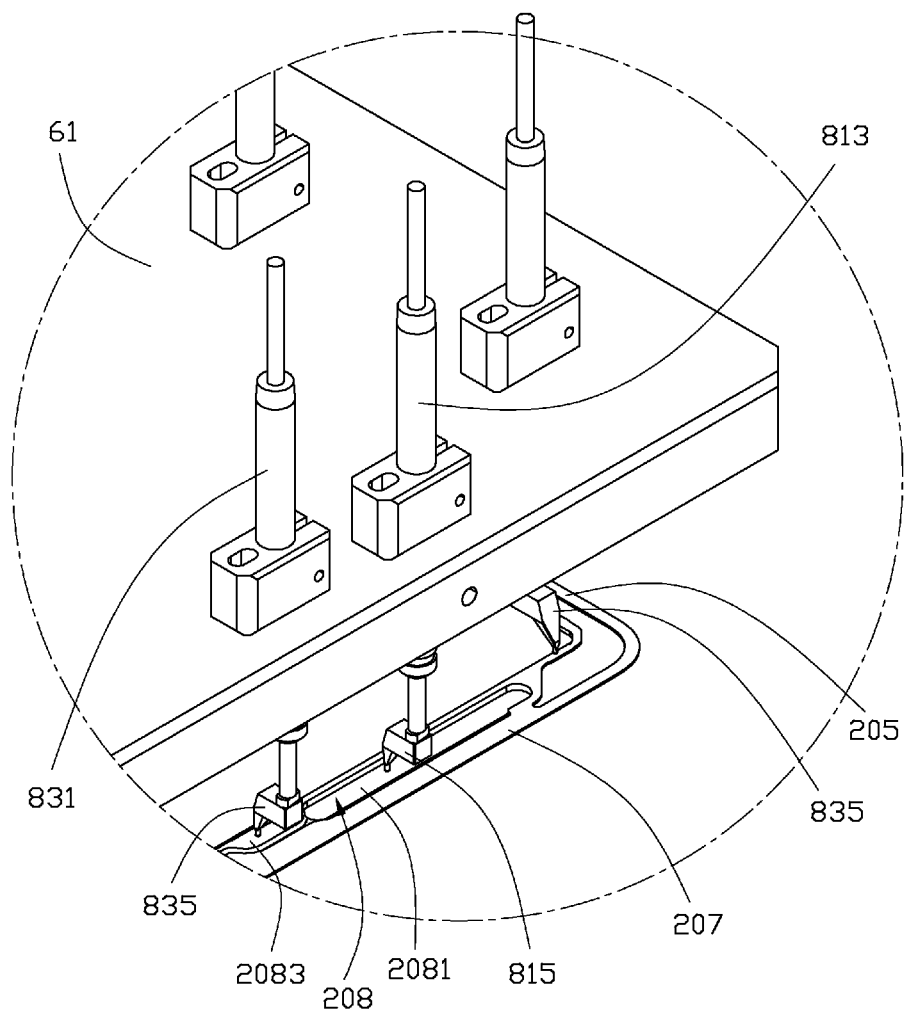
FIG. 6 shows an enlarged view of portion VI of FIG. 5.

FIG. 1 shows a measuring device 100 for automatically measuring sizes of a workpiece 200. In the illustrated embodiment, the measuring device 100 measures a length, a width, a height, and a segment difference of two surfaces with different heights. The workpiece 200 (as shown in FIG. 5) is rectangular, including a bottom surface 201 (as shown in FIG. 4), a top surface 203 opposite to the bottom surface 201, two first sidewalls 205 (as shown in FIG. 6) and two second sidewalls 207 (as shown in FIG. 6). The two first sidewalls 205 and the two second sidewalls 207 bend and extend from edges of the bottom surface 201 towards a direction away from the top surface 203. The two first sidewalls 203 are substantially parallel to each other and connected with the two second sidewalls 207. A stepped recess 208 (as shown in FIG. 6) is defined in an end surface of the second side wall 207. The stepped recess 208 has a first bottom surface 2081 and a second bottom surface 2083. The first bottom surface 2081 and the second bottom surface 2083 have different depths relative to the end surface of the second side wall 207 away from the top surface 203. In the embodiment, the first surface 2081 and the second surface 2083 are substantially parallel to each other. A length of the workpiece 200 is a vertical distance of the two second sidewalls 207. A width of the workpiece 200 is a vertical distance of the two first sidewalls 205. A height of the workpiece 200 is a vertical distance from the bottom surface 201 to the top surface 203.

Figure 3:
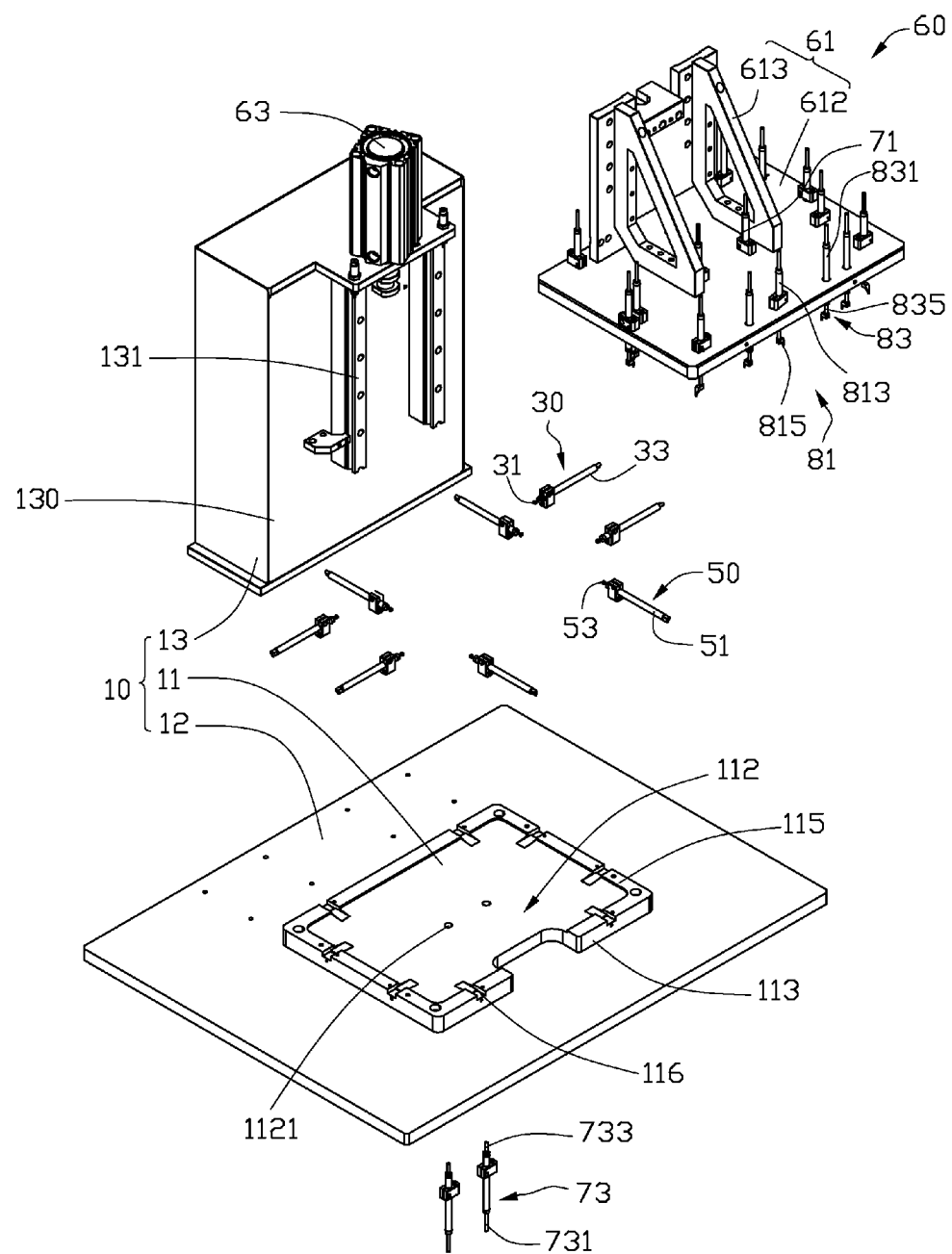
FIG. 3 shows an exploded view of the measuring device without the drivers and the controller of FIG. 1.

The measuring device 100 includes a measuring platform 10, four length measuring mechanisms 30, four width measuring mechanisms 50, a moving mechanism 60, two depth measuring mechanisms 70, a plurality of segment difference mechanisms 80 (as shown in FIG. 3), and a controller 101 (shown in FIG. 1).

Figure 2:
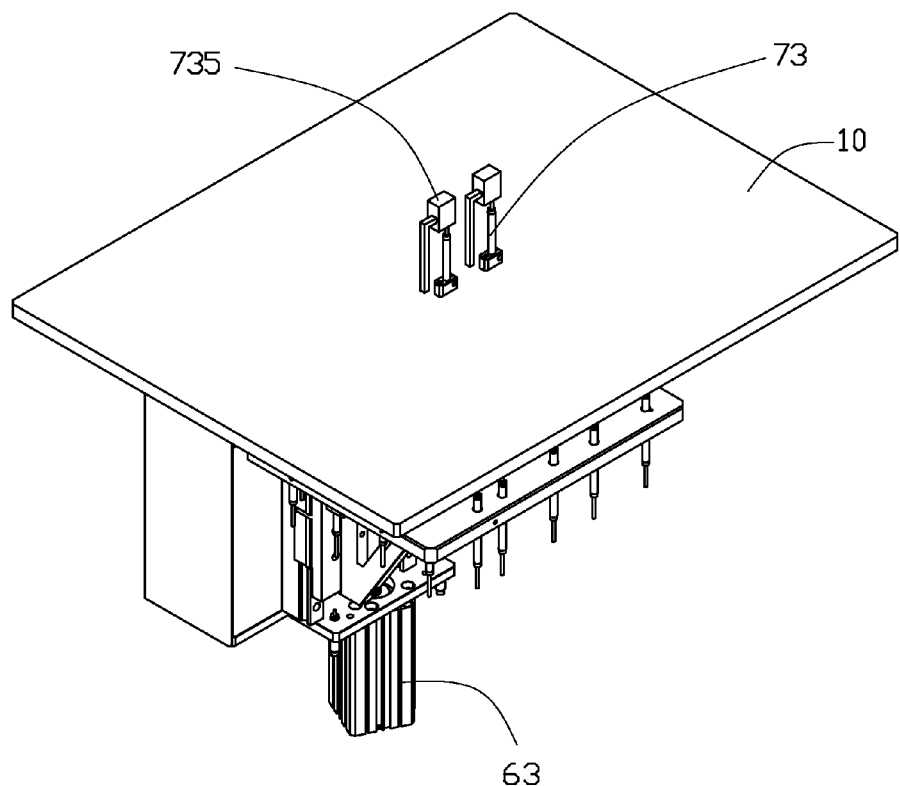
FIG. 2 is similar as FIG. 1, but viewed from another aspect.

FIGS. 1 to 3 show a measuring platform 10 including a mounting board 11, a fixing board 12, and a support bracket 13. The mounting board 11 includes a pair of first side surfaces 113 and a pair of second side surfaces 115. The first side surfaces 113 are opposite to each other, and each first side surface 113 is connected substantially perpendicularly to the corresponding second side surface 115. The mounting board 11 and the support bracket 13 are fixed on the fixing board 12. A positioning groove 112 is defined in a top surface of the fixing board 12 to receive and position the workpiece 200. Two through holes 1121 are separately defined in a bottom of the fixing board 12. Two measuring grooves 116 are separately defined in each of the first side surfaces 113 and the second side surfaces 115 and communicate with the positioning groove 112. The support bracket 13 is mounted on the fixing board 12 and abuts the mounting board 11. The support bracket 13 includes a main body 130 and two substantially parallel guiding rails 131 positioned on the main body 130. The main body 130 and the two guiding rails 131 are substantially perpendicular to the fixing board 12.

The controller 101 is positioned adjacent to the measuring platform 10. Desired movement ranges for different testing positions of the workpiece 200 for the length measuring mechanism 30, the width measuring mechanism 50, the depth measuring mechanism 70, and the plurality of segment difference mechanisms 80 can be predetermined in the controller 101. The controller 101 is electrically connected with the length measuring mechanisms 30, the width mechanisms 50, the height mechanisms 70, and the plurality of segment mechanisms 80.

The length measuring mechanisms 30 and the width measuring mechanisms 50 are the same structures. For simplicity, just the length measuring mechanism 30 is described in detail here. Each pair of the length measuring mechanisms 30 is positioned at a side of one second side surface 115 and the two pairs of the length measuring mechanisms 30 are oppositely positioned. Each length measuring mechanism 30 includes a sensor 31, a measuring member 33, and a driver 35. The sensor 31 is securely mounted on the second side surface 115, protruding into the positioning groove 116, and electrically connected with the controller. The measuring member 33 is movably received in the sensor 31. A first end portion of the measuring member 33 is connected to the driver, and a second end portion of the measuring member 33 extends into the positioning groove 116. The measuring member 33 is capable of moving relative to the sensor 31 for touching the second sidewall 203 of the workpiece 200. The sensor 31 is capable of obtaining movement distance for the measuring member 33 and transmitting the movement distance to the controller.

Two width measuring mechanisms 50 are positioned at one first side surface 113 and positioned opposite to another two width mechanisms 30. Each width mechanism 50 includes a sensor 51, a measuring member 53 movably received through the sensor 51, and a driver 55. The sensor 51 is fixedly mounted on the first side surface 113, protruding into the positioning groove 116, and electrically connected with the controller. A first end portion of the measuring member 53 is connected to the driver, and a second end portion of the measuring member 53 extends into the positioning groove 116. The measuring member 53 is capable of moving relative to the sensor 51 for touching the first sidewall 205 of the workpiece 200. The sensor 51 is capable of obtaining movement distances for the measuring member 53 and transmitting the movement distance to the controller 101.

FIGS. 5 and 6 show the moving mechanism 60 is assembled to the support bracket 13 above the mounting board 11. The moving mechanism 60 includes a support base 61 and a first driving member 63. The support base 61 is slidably assembled with the two guiding rails 131. The support base 61 includes a support portion 612 and a connecting portion 613 connected substantially perpendicularly with the support portion 612. The support portion 612 is movably mounted on the guiding rails 131. The first driving member 63 is mounted on the main body 130 and is connected to the connecting portion 613 for moving the support base 61 along the guiding rails 131.

FIGS. 2 to 4 show that the height measuring mechanism 70 includes two upper measuring assemblies 71 and two lower measuring assemblies 73. Structures of the upper measuring assembly 71 and the lower measuring assembly 73 are similar to the length measuring mechanism 30. The upper measuring assembly 71 includes a sensor 712 electrically connected to the controller, a measuring member 713 movably passing through the sensor 712, and a driver 715 connected to the measuring member 713. The sensors 712 are mounted on a middle portion of the support portion 612 and are spaced from each other. The driver 715 is capable of moving the measuring member 713 relative to the sensor 712 to touch the bottom surface 201 of the workpiece 200. The sensor 712 is capable of obtaining movement distance of the measuring member 713 and transmitting the movement distance to the controller 101. The lower measuring assembly 73 includes a sensor 731 electrically connected to the controller 101, a measuring member 733 movably received through the sensor 731 and the through hole 1121, and a driver 735 connected to the measuring member 733. The driver 735 is capable of driving the measuring member 733 to move relative to the sensor 731 to touch the bottom surface 203. The controller 101 is capable of obtaining the actual height of the workpiece 200 according to the movement distances of the measuring members 713, 733, and determining whether the actual height of the workpiece 200 is machined as desired.

The two segment difference measuring mechanisms 80 are mounted on edges of the support portion 612 above the mounting board 11. The segment difference measuring mechanism 80 includes a first measuring assembly 81 and a second measuring assembly 83. Structures of the first measuring assembly 81 and the second measuring assembly 83 are similar in length as the measuring mechanism 30. The first measuring assembly 81 includes a sensor 813, a measuring member 815 movably received through the sensor 813, and a driver 817 (as shown in FIG. 1) connected to the measuring member 815. The second measuring assembly 83 includes a sensor 831 (as shown in FIGS. 1 and 6), a measuring member 835 movably received through the sensor 831, and a driver 837 (as shown in FIG. 1) connected to the measuring member 835. The sensors 713 of the length measuring mechanism 712, the sensors 813 of the first measuring assemblies 81, and the sensors 831 of the second measuring assemblies 83 are separately positioned on the support base 61. The first driving member 63 is capable of moving the support base 61 relative to the support bracket 13, thereby the sensors 813 of the first measuring assemblies 81 and the sensor 831 of the second measuring assemblies 831 move to the top surface 203. The sensors 813 of the first measuring assemblies 81, and the sensor 831 of the second measuring assemblies 83 are electrically connected to the controller 101. The measuring member 815 is capable of being moved to the first surface 2081, and the measuring member 835 is capable of being moved to the second surface 2083. The controller 101 is capable of determining whether the actual height of the workpiece 200 is machined as desired according to the movement distances of the measuring members 813, 831.

In use, the workpiece 200 is received in the positioning groove 112. The bottom surface 201 is positioned towards a bottom of the positioning groove 112. The measuring members 33 of the length measuring mechanisms 30 are driven to touch the second sidewall 207. The measuring members 53 of the width measuring mechanisms 50 are driven to touch the first sidewall 205. The measuring members 713 of the upper measuring mechanisms 71 are driven to touch the top surface 203. The measuring members 733 of the lower measuring mechanisms 73 are driven to touch the bottom surface 201. The measuring members 815 of the first measuring assemblies 81 are driven to touch the first surface 2081. The measuring members 835 are driven to touch the second surface 2083. The sensors 31, 51, 712, 731, 813, 831 detect movement distances of corresponding measuring members 33, 53, 713, 733, 815, 835 and send movement distance data to the controller 101. The controller 101 calculates the length, the width, the height of the workpiece 200, and the segment difference of the first surface 2081 and the second surface 2083. The controller 101 compares the actual length, width, height and segment difference with the corresponding predetermined ranges and determines if the workpiece 200 is machined as desired.

The length measuring mechanisms 30, the width measuring mechanisms 50, the height measuring mechanisms 70, and the segment difference mechanisms 80 are capable of moving relative to the workpiece 200 and respectively touch the top surface 203, the bottom surface 201, the first sidewalls 205, and the second sidewalls 207. Comparing the movement distances of the measuring members 33, 53, 713, 733, 815, 835 with the corresponding predetermined ranges of the measuring members 33, 53, 713, 733, 815, 835, the controller 101 is capable of determining whether the workpiece 200 is machined as desired.

In other embodiments, the numbers of the guiding rails 131, the length measuring mechanisms 30, the width measuring mechanisms 50, the upper measuring assemblies 71, and the lower measuring mechanisms 73 can be one or more. The first driving members 63 and the support base 61 can be omitted, and the upper measuring assemblies 71 can be directly assembled to the support bracket 13. The lower measuring assemblies 73 can be omitted, and the upper measuring assemblies 71 can obtain the height of the workpiece 200. In other embodiments, the moving mechanism 60 can be omitted; the first measuring assemblies 81, the second measuring assemblies 83, and the upper measuring assemblies 71 are separately mounted on the support bracket 13. Both the first measuring assembly 81 and the second measuring assembly 83 include a driver connected to the measuring member.

In other embodiments, the mounting board 11 can be omitted. The workpiece 200 is directly mounted on the fixing board 12, and the length measuring mechanisms 30 and the width measuring mechanisms 50 are mounted on the fixing board 12.

While the present disclosure has been described with reference to particular embodiments, the description is illustrative of the disclosure and is not to be construed as limiting the disclosure. Therefore, those of ordinary skill in the art can make various modifications to the embodiments without departing from the true spirit and scope of the disclosure, as defined by the appended claims.

What is claimed is:

1. A measuring device configured for measuring a workpiece, the workpiece comprising a first surface and a second surface, the first surface and the second surface being positioned at different heights and being substantially parallel to each other, the measuring device comprising:
   a measuring platform comprising a fixing board and a support bracket mounted on the fixing board;
   a length measuring mechanism mounted on the fixing board for measuring a length of the workpiece;
   a width measuring mechanism mounted on the fixing board and spaced from the length measuring mechanism for measuring a width of the workpiece;
   a segment difference measuring mechanism comprising a first measuring assembly and a second measuring assembly, wherein both the first measuring assembly and the second measuring assembly comprises a sensor securely mounted on the support bracket, a measuring member movably passing through the sensor, and a driver connected to the measuring member,
   a controller electrically connected with the length measuring mechanism, the width measuring mechanism, the sensor of the first measuring assembly, and the sensor of the second measuring assembly,
   wherein the driver of the first measuring assembly is configured for moving the measuring member of the first measuring assembly to touch the first surface, the driver of the second measuring assembly is configured for moving the measuring member of the second measuring assembly to touch the second surface, the sensor of the first measuring assembly is configured for detecting a movement distance of the measuring member of the first measuring assembly and sending to the controller, the sensor of the second measuring assembly is configured for detecting a movement distance of the measuring member of the second measuring assembly and sending to the controller, the controller is configured for determining a segment difference of the first surface and the second surface whether as desired according to the movement distances of the first measuring assembly compared with the second measuring assembly with desired ranges of the movement distances.

2. The measuring device of claim 1, wherein a measuring platform comprises a mounting board fixed on the fixing board under the segment difference mechanism, the mounting board comprises a first side surface and a second surface opposite to the first side surface, measuring grooves are separately defined in the first side surface and the second side surface the length measuring mechanism and the width measuring mechanism are positioned on the mounting board and extend into corresponding measuring grooves.

3. The measuring device of claim 2, wherein the length measuring mechanism comprises a sensor, a measuring member movably received through the sensor of the length measuring mechanism, and a driver connected to the measuring member of the length measuring mechanism, the sensor of the length measuring mechanism is mounted on the second side surface, the measuring member of the length measuring mechanism is movably received through the corresponding measuring groove, the measuring member of the length measuring mechanism is movably received through the corresponding measuring groove, and the sensor of the length measuring mechanism is configured for detecting a movement distance of the measuring member of the length measuring mechanism and sending to the controller.

4. The measuring device of claim 1, wherein the width mechanism comprises a sensor, a measuring member movably received through the sensor, and a driver connected to the measuring member, and the sensor of the width measuring mechanism is capable of detecting a movement distance of the measuring member of the width measuring mechanism and sending to the controller.

5. The measuring device of claim 1, wherein the measuring device further comprises a height measuring mechanism mounted on the support bracket and electrically connected to the controller.

6. The measuring device of claim 5, wherein the measuring device further comprises a moving mechanism mounted on the support above the mounting board, the height mechanism, the first measuring assembly, and the second measuring assembly are separately mounted on the moving mechanism.

7. The measuring device of claim 6, wherein the moving mechanism comprises a support and a first driving member, the support base is movably mounted on the support, the first driving member is mounted on the support and connected to the support base, the height measuring mechanism comprises an upper measuring assembly and a lower measuring assembly, the upper measuring assembly comprises a sensor, a measuring member movably passing through the sensor of the upper measuring assembly, and a driver connected to the measuring member of the upper measuring assembly, the sensor of the upper measuring assembly, the sensor of the first measuring assembly, the sensor of the second measuring assembly are separately mounted on the support base and electrically connected to the controller, and the first driving member is configured for driving the support base to move relative to the support.

8. The measuring device of claim 7, wherein the support comprises a main body and a guiding rail positioned on the main body, the support base comprises a support portion and a connecting portion protruding substantially perpendicularly from the support portion, the connecting portion movably engages with the guiding rail, the first driving member is connected to the connecting portion, and the sensor of the upper measuring assembly, the sensor of the first measuring assembly, and the sensor of the second measuring assembly are positioned on the support portion in parallel.

9. The measuring device of claim 8, wherein the height measuring mechanism further comprises a lower measuring assembly, the lower measuring assembly comprises a sensor, a measuring member, and a driver connected to the measuring member, a through hole is defined through the mounting board, and the measuring member of the lower assembly movably passes through the though hole.

10. A measuring device comprising:
    a measuring platform comprising a fixing board and a support bracket mounted on the fixing board;
    a length measuring mechanism mounted on the fixing board;
    a width measuring mechanism mounted on the fixing board and spaced from the length measuring mechanism;
    a segment difference measuring mechanism comprising a first measuring assembly and a second measuring assembly, wherein both the first measuring assembly and the second measuring assembly comprises a sensor fixed on the support bracket, a measuring member movably passing through the sensor, and a driver connected to the measuring member, a controller electrically connected with the length measuring mechanism, the width measuring mechanism, the sensor of the first measuring assembly, and the sensor of the second measuring assembly, wherein the driver of the first measuring assembly is configured for moving the measuring member of the first measuring assembly, the driver of the second measuring assembly is configured for moving the measuring member of the second measuring assembly, the sensor of the first measuring assembly is configured for detecting a movement distance of the measuring member of the first measuring assembly and sending to the controller, the sensor of the second measuring assembly is configured for detecting a movement distance of the measuring member of the second measuring assembly and sending to the controller.

11. The measuring device of claim 10, wherein a measuring platform comprises a mounting board fixed on the fixing board under the segment difference mechanism, the mounting board comprises a first side surface and a second surface opposite to the first side surface, measuring grooves are separately defined in the first side surface and the second side surface the length measuring mechanism and the width measuring mechanism are positioned on the mounting board and extend into corresponding measuring grooves.

12. The measuring device of claim 11, wherein the length measuring mechanism comprises a sensor, a measuring member movably received through the sensor of the length measuring mechanism, and a driver connected to the measuring member of the length measuring mechanism, the sensor of the length measuring mechanism is mounted on the second side surface, the measuring member of the length measuring mechanism is movably received through the corresponding measuring groove, the measuring member of the length measuring mechanism is movably received through the corresponding measuring groove, and the sensor of the length measuring mechanism is configured for detecting a movement distance of the measuring member of the length measuring mechanism and sending to the controller.

13. The measuring device of claim 10, wherein the width mechanism comprises a sensor, a measuring member movably received through the sensor, and a driver connected to the measuring member, and the sensor of the width measuring mechanism is configured for detecting a movement distance of the measuring member of the width measuring mechanism and sending to the controller.

14. The measuring device of claim 10, wherein the measuring device further comprises a height measuring mechanism mounted on the support bracket and electrically connected to the controller.

15. The measuring device of claim 14, wherein the measuring device further comprises a moving mechanism mounted on the support above the mounting board, and the height mechanism, the first measuring assembly, and the second measuring assembly are separately mounted on the moving mechanism.

16. The measuring device of claim 15, wherein the moving mechanism comprises a support and a first driving member, the support base is movably mounted on the support, the first driving member is mounted on the support and connected to the support base, the height measuring mechanism comprises an upper measuring assembly and a lower measuring assembly, the upper measuring assembly comprises a sensor, a measuring member movably passing through the sensor of the upper measuring assembly, and a driver connected to the measuring member of the upper measuring assembly, the sensor of the upper measuring assembly, the sensor of the first measuring assembly, and the sensor of the second measuring assembly are separately mounted on the support base and electrically connected to the controller, and the first driving member is capable of driving the support base to move relative to the support.

17. The measuring device of claim 16, wherein the support comprises a main body and a guiding rail positioned on the main body, the support base comprises a support portion and a connecting portion protruding substantially perpendicularly from the support portion, the connecting portion movably engages with the guiding rail, the first driving member is connected to the connecting portion, the sensor of the upper measuring assembly, the sensor of the first measuring assembly, and the sensor of the second measuring assembly are positioned on the support portion in parallel.

18. The measuring device of claim 17, wherein the height measuring mechanism further comprises a lower measuring assembly, the lower measuring assembly comprises a sensor, a measuring member, and a driver connected to the measuring member, a through hole is defined through the mounting board, and the measuring member of the lower assembly movably passes through the though hole.

* * * * *